United States Patent [19]
McClelland

[11] 3,819,023
[45] June 25, 1974

[54] CONSTRUCTION FOR DISCHARGING ARTICLES FROM INCLINED STORAGE LANES

[76] Inventor: James F. McClelland, 40 Beacon Hill, Grosse Pointe Farms, Mich. 48236

[22] Filed: Aug. 10, 1972

[21] Appl. No.: 279,489

[52] U.S. Cl. ............................... 193/40, 221/295
[51] Int. Cl. ................................. B65f 11/00
[58] Field of Search ............. 193/32, 40; 214/1 PB; 221/289, 295

[56] References Cited
UNITED STATES PATENTS

| | | | |
|---|---|---|---|
| 2,426,095 | 8/1947 | Hecker | 214/1 PB |
| 2,980,222 | 4/1961 | Crosby | 193/40 X |
| 3,088,569 | 5/1963 | McClelland | 193/40 |
| 3,432,076 | 3/1969 | Arsenault | 221/295 |
| 3,561,578 | 2/1971 | Goodwin | 193/40 |

*Primary Examiner*—Robert B. Reeves
*Assistant Examiner*—Thomas E. Kocovsky
*Attorney, Agent, or Firm*—Farley, Forster and Farley

[57] ABSTRACT

A construction for supporting and discharging articles from the downstream end of an inclined article storage lane comprising a framework supporting and locating one or more release frames which extend longitudinally of the storage lane and carry a gate member movable between article stopping and releasing positions. Each release frame in turn supports portions of the storage lane on the upstream and downstream sides of the gate member in defined relation thereto. Improved toggle-type mechanism for actuating the gate member is also supported by each release frame so that the positioning and movements of the gate member are controlled relative to the portions of the storage lane supported by each release frame.

29 Claims, 5 Drawing Figures

FIG.3

CONSTRUCTION FOR DISCHARGING ARTICLES FROM INCLINED STORAGE LANES

SUMMARY OF THE INVENTION

This invention relates to a construction for discharging articles from the downstream end of an inclined storage or article supporting lane, such as a chute or rollerway employed in an automatic warehouse installation.

In such an installation, articles are stored on a multiplicity of storage lanes, each lane providing a live storage bank for articles of a particular type, and the articles are selected and withdrawn from storage by the remote operation of a release device provided at the downstream end of each storage lane. A release device suitable for a warehouse installation of this type is ordinarily intended to permit the release of only one article each time the device is actuated, and the successful operation of the installation depends upon the repetitive reliability of this unit-discharging function of the release device under the many variations in operating conditions encountered.

The overall object of the present invention is to provide a construction for the downstream end of a storage lane which will increase the reliability of the discharging operation, increase the flexibility and adaptibility of the construction with respect to articles of different sizes and weights, decrease the time required for installation and servicing of a release device and the structure associated therewith, and decrease the manufacturing cost thereof.

The construction of the present invention for discharging articles from the downstream end of an inclined article supporting lane along which the articles advance in a downstream direction under the control of a release having a gate movable between article stopping and releasing positions comprises a framework, with at least one release frame carried by the framework and supporting the gate, the release frame having portions on the upstream and downstream sides of the gate. The storage lane includes article supporting portions on the upstream and downstream sides of the gate, which portions of the storage lane are respectively supported adjacent to these sides of the gate by the upstream and downstream portions of the release frame and by the framework at locations spaced from the gate.

Preferably, the framework is common to a plurality of side-by-side storage lanes and includes a pair of parallel frame members extending trnasversely to the article supporting lane and in longitudinally spaced relation thereto adjacent the discharge end thereof, and each release frame includes a pair of parallel, interconnected and transversely spaced side members which extend longitudinally of the article supporting lane and have end portions or tabs, these tabs and the transverse members of the framework having interfitting surfaces which define the position of the release frame in a direction longitudinally of the article supporting lane and vertically with reference to the article supporting plane thereof. A release frame can be installed merely by inserting the release frame into position between the pair of parallel frame members, and the construction establishes the geometrical or positional relationship of the release frame and the gate to the article supporting surface of the storage lane.

Either a single release frame, or a plurality of release frames, may be employed with an improved construction for supporting and moving the release gate between the article stopping and releasing positions thereof. The release gate is secured to a pair of transversely spaced gate supporting levers which are pivotally carried by the side members of a release frame, or by the side members of a pair of release frames. A toggle linkage is connected to each of the gate supporting levers and to a common shaft mounted between the side members of a release frame, or between the side members of a pair of release frames. This toggle linkage is capable of locking the gate in the article stopping position, and of moving the gate to the released position when the shaft is rocked by a crank secured to the shaft and connected to an actuating device such as a solenoid. An article supporting roller carried by the release frame or frames on the upstream side of the gate, and an article contacting roller carried by the gate supporting levers, contribute to accelerating the movement of the article being released in order to create a gap between this article and a following article and permit the release gate to return to the stopping position in time to halt movement of the following article.

This improved construction enables the release to withstand the various loading and impact forces which contribute to malfunctioning; permits the gate to be moved from stopping to releasing positions positively and quickly by the initially low but gradually increasing force available from the stroke of a standard type of solenoid; and, permits, through the use of multiple release frames an extended range in the size of the release gate for storage lanes of increasing width.

Other features and advantages of the invention will appear from the description to follow of the representative embodiment disclosed in the accompanying drawings.

DESCRIPTION OF THE PREFERRED EMBODIMENT

Figure 1:
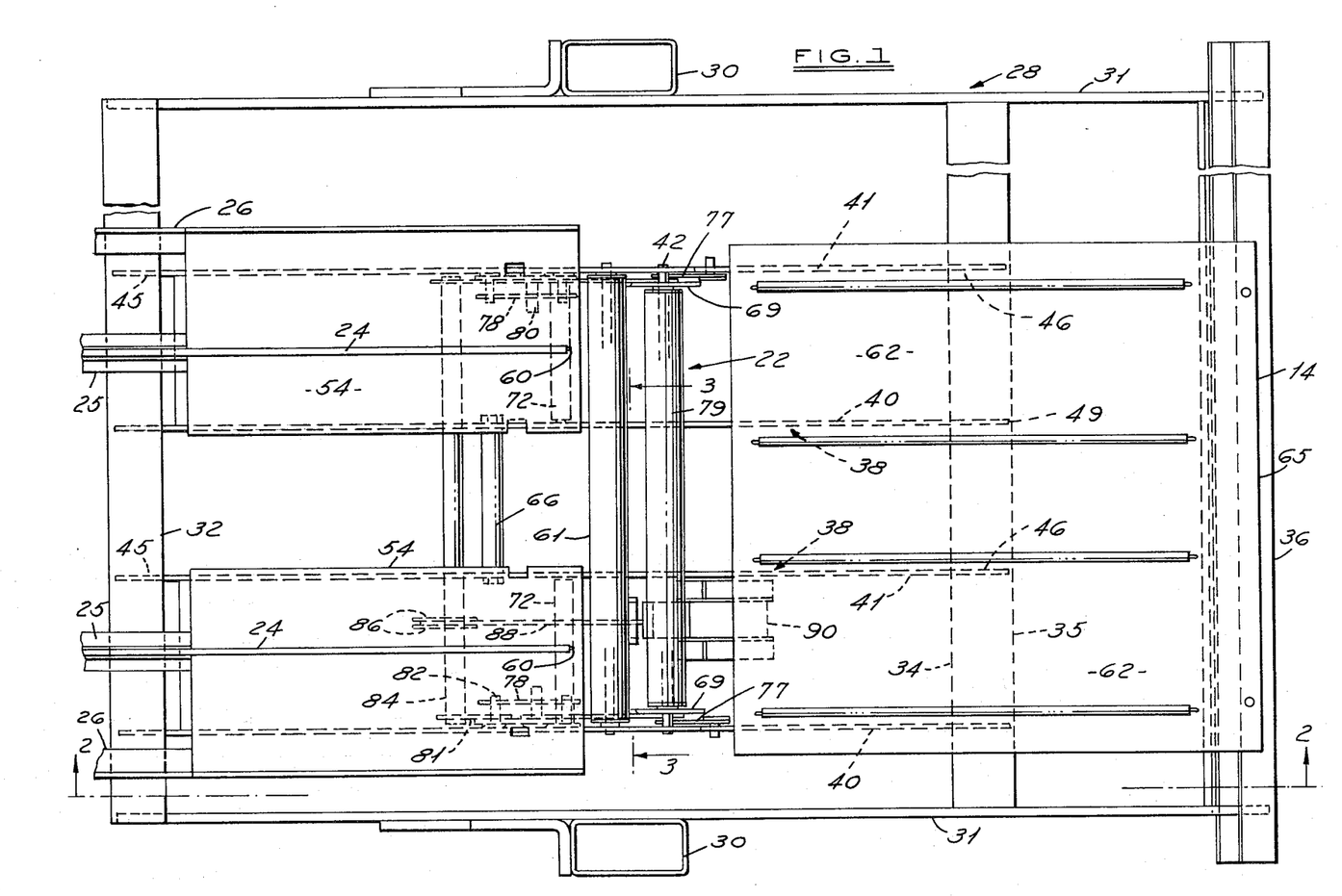
FIG. 1 is a plan view showing the downstream end of an article storage lane, constructed in accordance with the invention.
Figure 2:
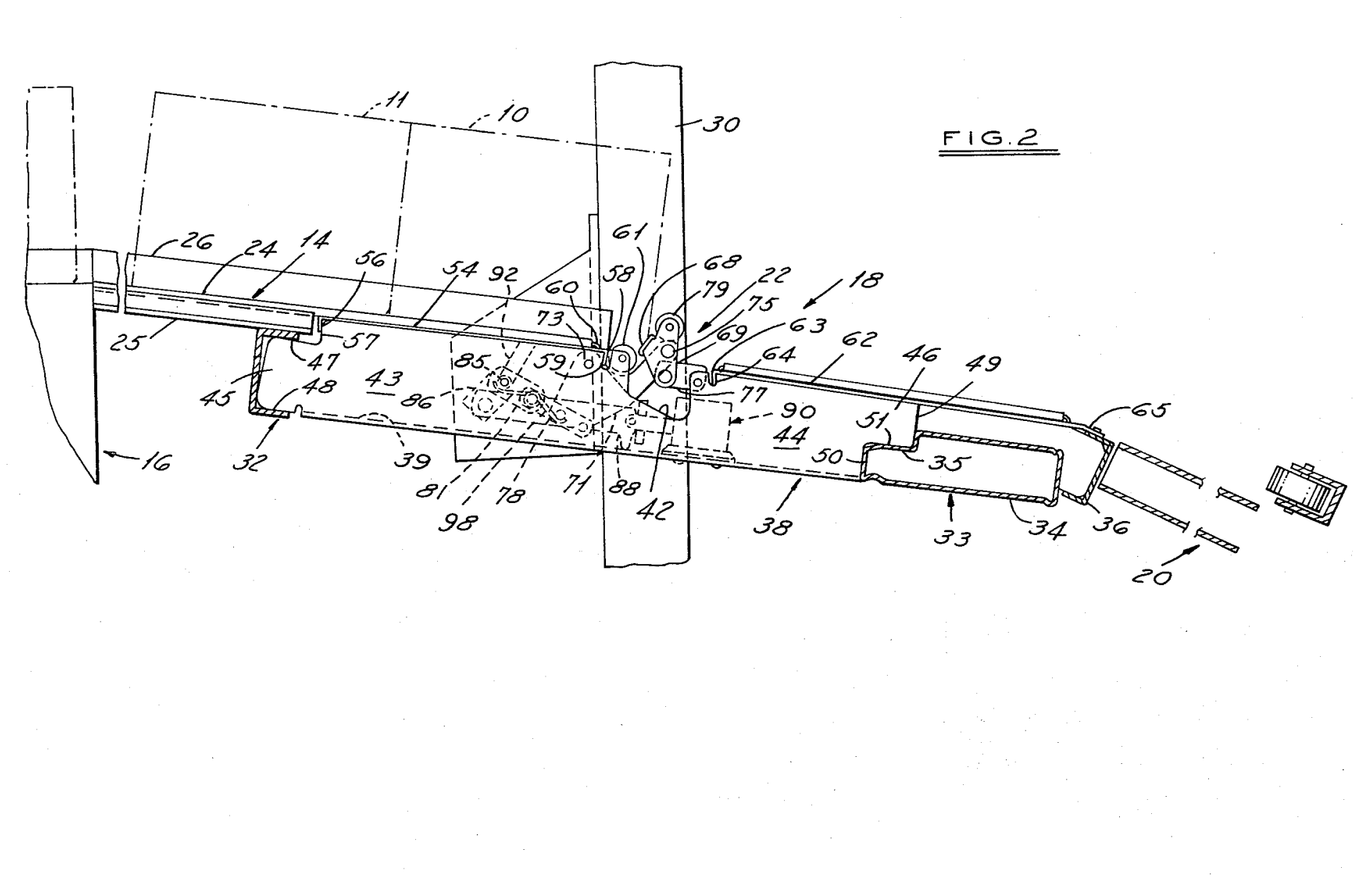
FIG. 2 is a sectional elevation, taken as indicated by the line 2—2 of FIG. 1 but also showing the upper portion of the storage lane and a conveying device onto which articles are discharged from the storage lane.

Referring to FIGS. 1 and 2, articles 10, 11 etc., are placed on a downwardly inclined storage lane 14 from an elevated loading structure 16, schematically illustrated in FIG. 2, for gravity urged movement toward the downstream end 18 of the storage lane where the discharge of the articles onto a suitable conveying device 20 is controlled by a gate 22, movable between a stopping position shown in FIG. 2 and a releasing position in which the gate is retracted below the article supporting surface of the lane. This article supporting surface may be provided by a pair of runners 24 mounted on runner supports 25, as shown, or by a chute, or a rollerway. Side guides 26 define the width of the lane.

The foregoing components are currently employed in warehouse installations of the type under discussion which include a multiplicity of such article supporting lanes 14 arranged in side-by-side relation. Each lane provides live storage of articles of a particular type which can be selected and withdrawn from storage as desired by actuating the proper release gates the desired number of times, when a single article is discharged on each actuation.

The present invention provides a construction for the downstream end 18 of a storage lane. As shown in FIGS. 1 and 2, a framework 28 is provided, supported by a pair of upright members 30, and consisting of a pair of longitudinally extending frame members 31 suitably connected to the uprights 30 and a pair of parallel, transversely extending and longitudinally spaced frame members 32 and 33. The uprights 30 are transversely spaced apart a distance such as to define a span or length of the transverse frame members sufficient to accommodate a plurality of storage lanes 14 (FIG. 2), depending upon the individual width thereof. In the construction shown, the upstream frame member 32 is a channel section; the lower frame member 33 is a generally rectangular tube 34 having a notch or step 35, and is combined with a channel section member 36 which may also support a portion of the conveyor 20.

A plurality of release frames 38 are carried by the framework 28, at least one release frame 38 being used to movably support the gate 22 of each storage lane 14. In the construction illustrated, which is for a relatively wide storage lane, the gate 22 is supported by a pair of transversely spaced release frames 38, as will be more fully described below.

Figure 3:
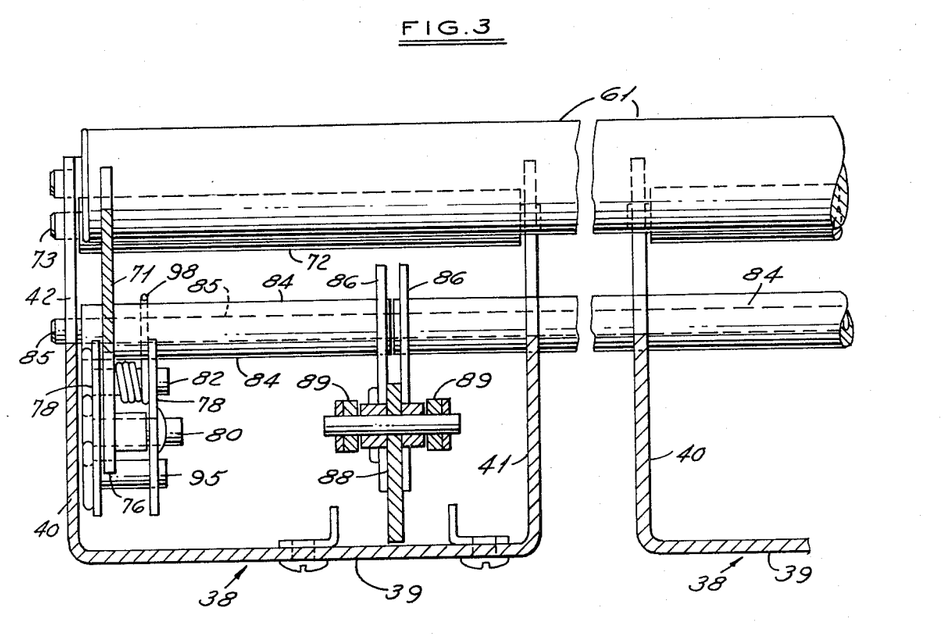
FIG. 3 is an enlarged transverse sectional elevation on the line 3—3 of FIG. 1.

Each release frame 38 is U-shaped, as shown in FIG. 3, and includes a base plate 39 and a pair of side members 40 and 41. The side members 40 and 41 each include a recess 42 (FIG. 2) adjacent to the location of the gate 22, portions 43 and 44 on the upstream and downstream sides of the recess 42, respectively, and upstream and downstream ends 45 and 46 engageable with the transverse frame members 32 and 34 respectively. These ends 45 and 46 of the frame side members are in the nature of tabs which extend beyond the ends of the bottom plate 39, the end 45 including upper and lower longitudinally extending surfaces 47 and 48 which are adapted to be interfittingly engaged within the channel section of the frame member 32. The end 46 is provided with end surfaces 49 and 50 and a longitudinally extending surface 51 which interfittingly engage the stepped portion 35 of the tubular transverse frame member 34. These interfitting surfaces on the ends 45 and 46 of the release frame members accurately position and locate the release frame on the framework 28, both longitudinally relative to the article supporting lane and vertically relative to the article supporting plane thereof. Moreover, these interfitting surfaces make the operation of assembling a release frame to the framework 28 a relatively simple one, it being only necessary to insert the ends 45 of the release frame side members within the channel section of the transverse frame member 32 and rock the release frame in a clockwise direction as viewed in FIG. 2 to place the surfaces on the ends 46 in engagement with the surfaces of the transverse frame member 34.

When a release frame 38, or a pair of release frames 38 as illustrated in FIGS. 1 and 2, have been assembled to the framework 28, a plate 54 is mounted on the upper edges of the upstream portion 43 of each release frame, the plate 54 being provided with a downturned flange 56 at the upper edge thereof which engages end surfaces 57 on the release frame, and with a downturned flange 58 at the lower edge thereof which engages notches 59 formed in the release frame side members. The runners 24 which form the article supporting surface of the lane, are then extended over the plates 54 and the ends of the runners are anchored thereto, as indicated at 60. The article supporting portion of the storage lane on the upstream side of the gate 22 is completed by an article supporting roller 61 rotatably carried between the release frame side members. An apron 62 is supported on the upper edges of the downstream portion 44 of each release frame, the apron having a downturned flange 63 engaging notches 64 in the sides of the release frames, and being secured at its lower edge 65 to the transverse frame member 36.

Figure 5:
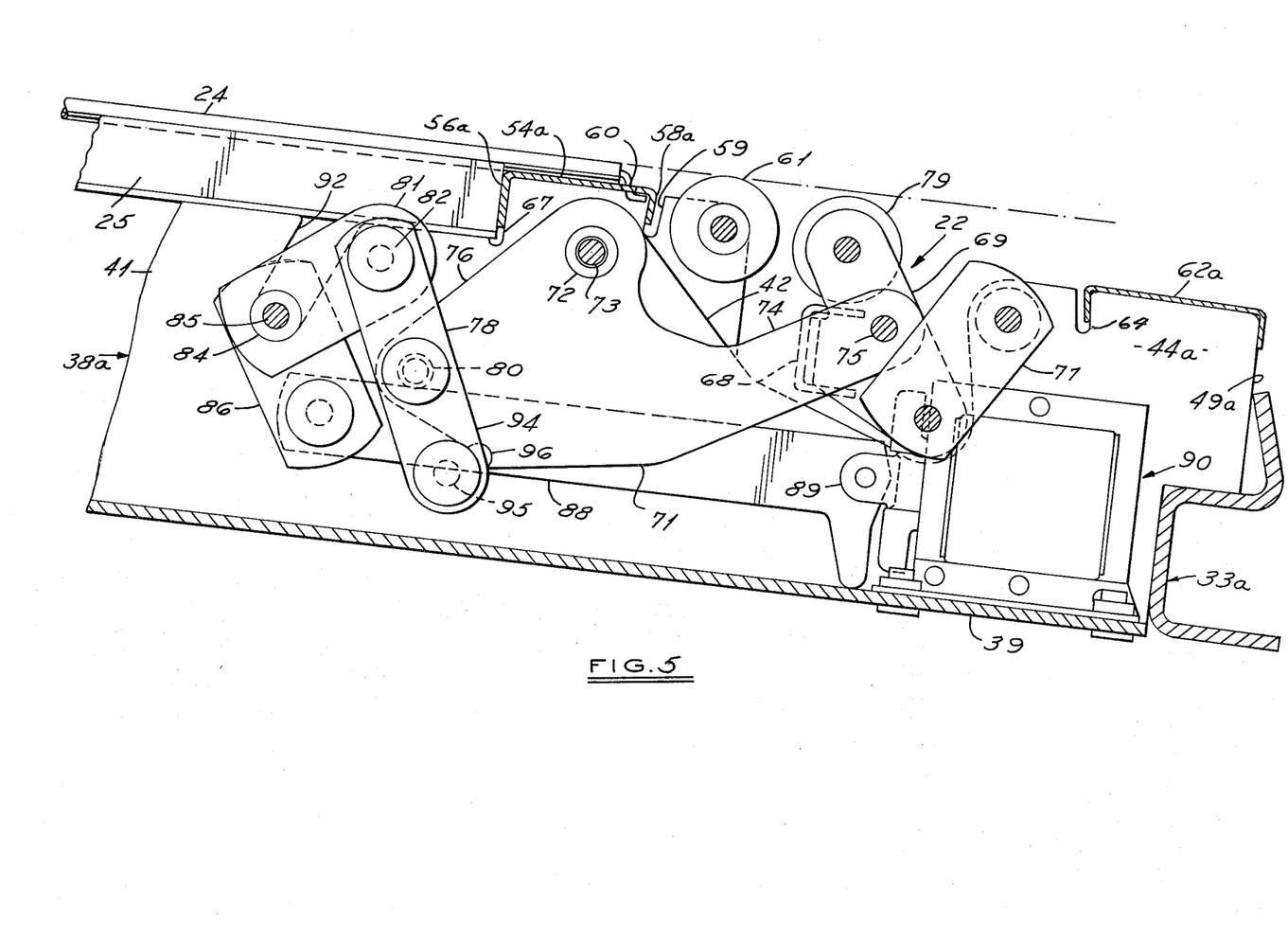

A modified construction is shown in FIG. 5 of the article supporting surface supported by a release frame 38a. The runner supports 25 extend beyond the upper transverse frame member 32 to a relatively short plate 54a mounted on the upper edges of the sides of the release frame 38a on the upstream side of the gate, the plate 54a being provided with a downturned flange 56a at the upper edge thereof, which flange engages a step 67 in the sides of the release frame, and with a downturned flange 58a at the lower edge thereof which engages the notches 59. The runners 24 extend over the plate 54a and are anchored thereto, at 60. A relatively short apron 62a is supported on a relatively shorter downstream portion 44a of the release frame which interfittingly engages a modified form of transverse frame member 33a, the apron 62a having donwturned flanges engaging the notches 64 and the release frame end surfaces 49a.

Thus, in either construction the release frame supports article supporting portions of the storage lane on the upstream and downstream sides of the gate and these portions of the article supporting lane, namely, the runners 24 and apron 62 or 62a, are also supported by the transverse frame members 32 and 33 or 33a of the framework 28 at locations spaced from the upstream and downstream sides of the gate. Each release frame thereby establishes the location of portions of the path of travel of an article along the storage lane relative to the gate on both the approaching and exiting sides thereof.

When a pair of release frames 38 are employed for one storage lane, as shown in FIG. 1, these release frames are suitably interconnected by a spacer or spacers 66, and suitable clips or abutments can be provided on the transverse frame members 32 and 34 to prevent transverse shifting of the release frames, if required.

Referring to FIGS. 1, 2, 4 and 5, the gate 22 includes a stop face 68 mounted between a pair of links 69 which in turn are each paired with an outer link 70 and pivotally connected to one of a pair of gate supporting levers 71, FIG. 2 showing the gate in stopping position and FIG. 5 showing the gate in releasing position. As shown in FIG. 2, the stop face 68 is inclined upwardly and in the downstream direction relative to the article supporting lane, when the gate is in stopping position, and is closely adjacent to the end of the lane defined by the roller 61. The gate supporting levers 71 are each secured to a tubular sleeve 72 mounted on a pivot shaft 73 carried by the release frame side members, and each gate supporting lever includes a supporting arm portion 74 connected to the gate links 69 and 70 by a pivot 75 and an actuating arm portion 76. A roller 79 is mounted on the pairs of gate links 69 and 70 each pair of which is also pivoted to a control link 77 attached to one of the release frame side members on the downstream side of the gate.

Figure 4:
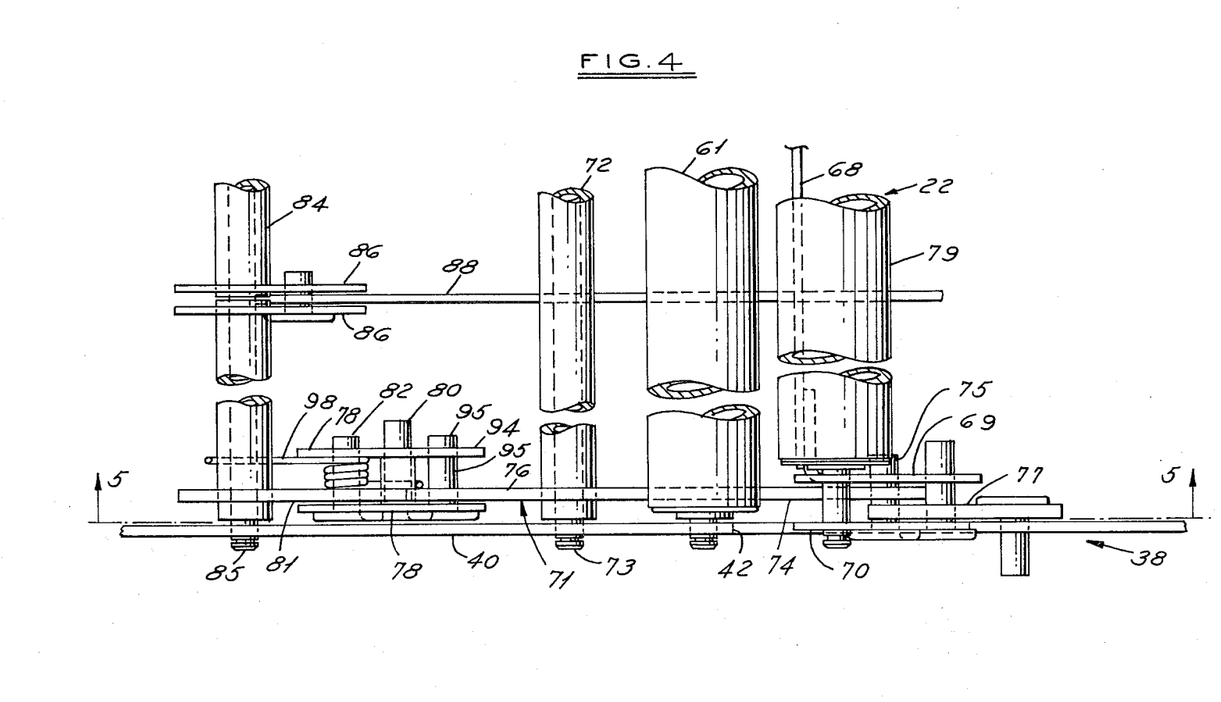
FIG. 4 is an enlarged fragmentary plan view of the construction of the improved release of the invention as shown in FIG. 5; and, FIG. 5 is a sectional elevation of the release construction, taken as indicated by the line 5—5 of FIG. 4, and also showing a modified form of storage lane construction.

Actuating means for rocking the gate supporting levers in unison to move the gate between article stopping and releasing positions include pairs of toggle links 78 (FIG. 4) connected to the actuating arm portion 76 of each lever 71 by a pivot 80 and connected to a second toggle link 81 by a pivot 82. Each of the second toggle links 81 is fixed to a tubular shaft 84 mounted on an axle 85 carried by the release frame side members, and the shaft 84 is rockable by a crank 86 secured thereto and pivotally connected to a link 88 connected in turn to the plunger 89 of a solenoid 90 mounted on the base member 39 of a release frame. In the construction shown, where the gate member is supported between a pair of the release frames 38, each of the inboard or adjacent release frame side members are provided with a slot 92 through which the shaft 84 passes, and the shaft 84 is of split construction as best shown in FIG. 4, each portion of the shaft being secured to a crank 86. Each of the toggle links 78 includes an extension 94 provided with a cross pin 95 engageable, when the gate is in stopping position, in a notch 96 formed in the gate supporting lever 71 to which the toggle link 78 is connected, thereby forming abutment means which lock the gate supporting lever in the stopping position of the gate; and, each actuating lever is normally urged to this stopping position by a hairpin spring 98 mounted on the pivot 82 between the toggle links 78 and 82 and engaging the shaft 84 and the pivot 80, as best shown in FIG. 4.

The advantages of the invention can perhaps best be understood from a review of some of the more important considerations which apply to the operation of a storage lane in an automatic warehouse. When a storage lane is first loaded or replenished with a supply of the articles to be stored thereon, severe forces are imposed against the gate of the release device. In the case where an empty lane is loaded, a high impact force against the gate is created by the first article stopped thereby, and this impact force is usually localized because an article rarely travels down the lane with a truly parallel relation between the leading edge of the article and the stop face of the gate. This initial impact against the gate is followed by increased loading forces thereon as the number of articles placed in storage in the lane is increased, also creating increased frictional resistance between the first article and the gate. Localized impact forces can cause a gate to cock and jam the locking mechanism; while the force against a gate when a storage lane is loaded with articles can create so much resistance that the actuating mechanism is incapable of moving the gate from the stopping to a released position.

These various forces are all provided for by the construction of the present invention. The release gate 22 including the stop face 68 is supported by the pair of levers 71 which can be spaced apart transversely almost the full width of the lane, and which are positively locked in the stopping position of the gate by the toggle linkage of the actuating mechanism which absorbs all forces against the stop face in the line of action position. This results in a very rigid gate construction highly resistant to impact forces over the range in weight of articles normally handled, and allows the use of storage lanes wide enough for articles to be placed thereon with their longest dimension extending transversely of the lanes thereby increasing the number of articles per lane, reducing the number of lanes and related equipment, and reducing the time required for an article to pass the release.

When the solenoid 90 is actuated to retract the stop face 68, the force required to break the toggle linkage and initiate the retracting movement of the gate is relatively small, even when the storage lane is completely loaded, and corresponds with the type of force available from a relatively inexpensive standard form of solenoid at the beginning of its working stroke. Frictional resistance between the gate and the face of the leading article is a minor factor in the present construction because the initial movement of the stop face 68 of the gate 22 is in the direction of the downstream article movement.

As the working stroke of the solenoid 90 continues, the force available to retract the gate increases so that the stop face 68 is quickly pulled into a retracted position and any drag between the stop face and leading edge of the first article is overcome. This movement of the stop face from stopping to releasing position is regulated by the control links 77 which impart to the gate an initial component of motion in the downstream direction followed by a final component of motion in the upstream direction as the gate moves below the article, thus placing the gate roller 79 under the bottom surface of the article being discharged and permitting the solenoid 90 to be de-energized. The gate will then be held in the released position by the article on the roller 79, in readiness to be returned to the stopping position by the springs 98 as soon as the article being discharged passes the gate.

The roller 79, when used, together with the roller 65 forming the article supporting surface on the upstream side of the gate, aid in enabling the article being discharged to accelerate away from the next following article and to create a gap for the release to return to the stopping position. This acceleration and the gap between articles also results from the geometry of the release frame and the portions of the article supporting lane supported thereby on the upstream and downstream sides of the gate. Referring to FIGS. 2 and 5, it will be noted that the upper edges of the side members 40 and 41 on the downstream portion 44 of the release frames 38 are lower and have a greater slope than those of the upstream portion 43 so that the apron 62 or 62a supported by the downstream portion 44 is lower and has a greater angle of inclination, thereby increasing the tendency of the article being dishcarged to accelerate, and causing this article to rock around the supporting roller 61 and gate roller 79 to aid in creating a gap into which the release gate can return to a stopping position. The relationship of the portions of the article storage lane on the upstream and downstream sides of the gate is established by the construction and geometry of the framework 28 and elease frames 38, as is the alignment of the release gate 22 with these portions of the storage lane. Misalignment between these components can result in irregular malfunctioning of the gate and is an extremely difficult and time consuming matter to correct by installation or service adjustment.

The construction also permits the portion of the storage lane on the upstream side of the gate to be terminated as close thereto as possible and to be defined by the supporting roller 61. Too great a space between the end of the storage lane and face of the gate will provide a gap into which an article can nosedive and jam when the gate is released.

Finally, the various components of the construction of the invention, particularly the release frames, the release gate supporting levers, the control links and toggle linkage can all be easily and precisely manufactured with the repetitive accuracy attainable by punch and die techniques. The assembly of these components is straight forward and is facilitated by the fact that each gate supporting lever 71 of the pair is connected to gate link 69 and to a toggle link 78, but is not otherwise connected to the other lever of the pair. In other words, a certain degree of relative movement, or "float", is possible between the pair of supporting levers, so that no fixture is required for their assembly ; in their operation, a degree of independent motion can occur during their movement in unison by the pairs of toggle linkage. These constructional features further insure uniform accuracy of manufacture and installation and the attainment of the desired result of repetitive reliable operation in discharging one article at a time from a storage lane.

I claim:

1. A construction for the downstream end of an inclined article supporting lane along which the articles advance in a downstream direction under the control of a release having a gate movable between article stopping and releasing positions, wherein the improvement comprises:
   a framework for supporting the downstream end of the article supporting lane;
   at least one release including a frame supporting the gate, the release frame being carried by the framework and having portions on the upstream and on the downstream sides of the gate; and,
   the article supporting lane including an article supporting portion on the upstream side of the gate and an article exiting portion on the downstream side of the gate, said portions of the storage lane being respectively supported adjacent to the upstream and downstream sides of the gate by the upstream and downstream portions of the release frame and being supported by said framework at locations spaced from said sides of the gate.

2. A construction as set forth in claim 1 wherein the article supporting portion of the storage lane on the upstream side of the gate is terminated by article supporting roller means carried by the release frame and extending substantially the width of the article supporting lane.

3. A construction as set forth in claim 1 wherein the framework includes a pair of parallel frame members extending transversely of the article supporting lane in longitudinally spaced relation thereto, the release frame extending longitudinally between said frame members and having end portions supported thereby.

4. A construction as set forth in claim 3 wherein said frame members and the end portions of the release frame are provided with interengageable surfaces which define the position of the release frame in a direction longitudinally of the article supporting lane and vertically with reference to the article supporting plane thereof.

5. A construction as set forth in claim 3 wherein said frame members extend transversely to the article supporting lane a distance such that said frame members are capable of supporting a plurality of release frames.

6. A construction as set forth in claim 1 wherein said portions of the release frame on the upstream and downstream sides of the gate are formed at least in part by a pair of release frame side members which extend longitudinally of the article supporting lane.

7. A construction as set forth in claim 6 wherein the framework includes a pair of frame members extending transversely to the article supporting lane and in longitudinally spaced relation thereto, said release frame side members each having end portions, and interfitting surfaces provided on the frame members and the end portions of the release frame side members to define the position of the release frame longitudinally of the article supporting lane and vertically with respect to the article supporting plane thereof.

8. A construction as set forth in claim 7 further including means carried by the release frame side members for movably supporting the gate.

9. A construction as set forth in claim 8 wherein the means for movably supporting the gate include a pair of transversely spaced gate supporting arms pivotally carried by the release frame, and means for rocking the gate supporting arms in unison to move the gate between article stopping and releasing positions.

10. A construction as set forth in claim 9 wherein the means for rocking each gate supporting arm includes a toggle link pivotally connected thereto, a second toggle link mounted on an axis extending between the release frame side members and pivotally connected to the first toggle link, means for rocking the toggle links in unison, and abutment means for locking the gate supporting arms in the locking position of the gate.

11. A construction as set forth in claim 9 wherein the gate is pivoted to the gate supporting arms on an axis extending transversely to the article supporting lane, and a control link is pivotally connected between the release frame and the gate for defining the position thereof about said pivotal axis.

12. A construction as set forth in claim 9 wherein the gate is provided with a stop face engageable by an article on the article supporting lane when the gate is in the stopping position, and with a roller mounted above the stop face, the roller being engageable with the underside of such article when the gate is moved to the releasing position.

13. A construction as set forth in claim 1 wherein the framework includes a pair of parallel frame members extending transversely to the article supporting lane and in longitudinally spaced relation thereto adjacent the discharge end thereof; the release frame including a pair of parallel, transversely spaced side members extending longitudinally of the article supporting lane and having end portions interfittingly engaging said transverse frame members, the transverse spacing between the side members of the release frame being less than the length of said transverse frame members so that a plurality of release frames can be supported thereby.

14. A construction as set forth in claim 13 further including means carried by a plurality of release frames for movably supporting the gate.

15. A construction as set forth in claim 14 wherein the means for movably supporting the gate include a pair of transversely spaced gate supporting arms pivotally carried by the release frames, and means for rocking the gate supporting arms in unison to move the gate between article stopping and releasing positions.

16. A construction as set forth in claim 15 wherein the gate is pivoted to the gate supporting arms on an axis extending transversely to the article supporting lane, and a control link is pivotally connected between at least one of the release frames and the gate for defining the position thereof about said pivotal axis, the control link as the gate is moved from the stopping to the releasing position being capable of imparting to the gate an initial component of motion in the downstream direction followed by a component of motion in the upstream direction as the gate moves below the article.

17. A construction as set forth in claim 15 wherein the means for rocking each gate supporting arm includes a toggle link pivotally connected thereto, a shaft supported on an axis extending between the pair of release frames, a second toggle link fixed to the shaft and pivotally connected to the first toggle link, and means carried by at least one of the release frames for rocking the shaft.

18. A construction as set forth in claim 17 wherein the means for rocking the shaft includes a solenoid supported by one of the release frames, and a crank fixed to the shaft and operatively connected with the solenoid.

19. A release device having a gate movable between article stopping and releasing positions for controlling the discharge of articles from the downstream end of an inclined article supporting lane, comprising:
a release frame including a pair of parallel side members, transversely spaced a desired distance relative to the width of the article supporting lane;
a pair of transversely spaced gate supporting levers pivotally carried by the frame side members, each gate supporting lever including a supporting arm portion and an actuating arm portion, and the gate having a stop face secured between the supporting arm portions;
and means for rocking the gate supporting levers in unison to move the gate between article stopping and releasing positions, including a toggle link pivotally connected to the actuating arm portion of each lever, a pair of second toggle links mounted on an axis extending between the release frame side members and pivotally connected to the first toggle links, and means for rocking the toggle links.

20. A release device as set forth in claim 19 wherein the first toggle links and the actuating arm portions of the gate supporting levers are provided with interengageable abutment means which lock the gate supporting levers in the stopping position of the gate.

21. A release device as set forth in claim 19 wherein the gate includes a roller rotatably mounted above the stop face of the gate, the roller being engageable with the underside of an article on the article supporting lane when the gate is moved to the releasing position.

22. A release device according to claim 19 wherein the gate is pivoted to the gate supporting levers, and a control link is pivotally connected between the release frame and the gate for defining the position thereof about said pivotal axis, the control link as the gate is moved from the stopping to the releasing position being capable of imparting to the gate an iniital component of motion in the downstream direction followed by a component of motion in the upstream direction as the gate moves below the article.

23. A release device according to claim 19 wherein the means for rocking the toggle links includes a solenoid supported by the release frame.

24. A release device according to claim 19 wherein the stop face of the gate is inclined upwardly and in the downstream direction relative to the article supporting lane when the gate is in the stopping position, the stop face in such position being closely adjacent to the downstream end of the article supporting lane.

25. A release device as set forth in claim 19 further including abutment means between the actuating arm portions of the gate supporting levers and the means for rocking said levers, said abutment means being capable of locking the gate supporting levers in the stopping position of the gate.

26. A release device as set forth in claim 19 wherein the gate supporting levers are transversely spaced a distance substantially equal to the width of the article supporting lane.

27. A release device as set forth in claim 26 wherein the gate includes a roller rotatably mounted above the stop face of the gate, the roller being engageable with the underside of an article on the article supporting lane when the gate is moved to the releasing position.

28. A release device as set forth in claim 19 further including a supporting roller rotatably carried between the release frame side members adjacent to the upstream side of the gate, the periphery of the supporting roller being adapted to be engaged by the underside of an article on the upstream side of the gate.

29. A release device as set forth in claim 28 wherein the supporting roller has a length substantially equal to the width of the article supporting lane.

* * * * *